United States Patent [19]

Lee

[11] Patent Number: 5,480,289

[45] Date of Patent: Jan. 2, 1996

[54] CONNECTOR AND MOUNTING ARRANGEMENT FOR A WINDSHIELD WASHER PUMP

[76] Inventor: Albert Lee, 232 Margate Rd., Timonium, Md. 21093

[21] Appl. No.: 305,346

[22] Filed: Sep. 13, 1994

[51] Int. Cl.$^6$ ..................................................... F04B 53/16
[52] U.S. Cl. ............... 417/360; 417/423.14; 417/423.15; 285/177
[58] Field of Search ............... 417/360, 423.1, 417/423.14, 423.15, 424.1, 442; 415/213.1; 239/284.1

[56] References Cited

U.S. PATENT DOCUMENTS

| 2,701,897 | 2/1955 | Leming | 239/284.1 |
| 3,783,700 | 1/1974 | Kuck | 74/55 |
| 4,600,367 | 7/1986 | Terauchi et al. | 417/362 |

FOREIGN PATENT DOCUMENTS

| 843941 | 7/1952 | Germany | 415/213.1 |
| 7536534 | 5/1976 | Germany | 417/424 |
| 309751 | 11/1955 | Switzerland | 239/284.1 |
| 672190 | 5/1952 | United Kingdom | 239/284.1 |
| 718336 | 11/1954 | United Kingdom | 239/284.1 |

Primary Examiner—Richard A. Bertsch
Assistant Examiner—Roland G. McAndrews, Jr.
Attorney, Agent, or Firm—Birch, Stewart, Kolasch & Birch

[57] ABSTRACT

A windshield washer pump includes an entrance connector having a check valve disposed therein and a plurality of annular raised portions disposed thereon, and an exit connector having a check valve disposed therein and a plurality of annular raised portions disposed thereon for effectively spraying the washing liquid and mating with various types of hoses, and a pair of vertical and longitudinal engagement holes disposed on a mounting bracket for easily mounting to the engine body.

4 Claims, 2 Drawing Sheets

CONNECTOR AND MOUNTING ARRANGEMENT FOR A WINDSHIELD WASHER PUMP

BACKGROUND OF THE INVENTION

1. Field of the Invention

The present invention relates to a windshield washer pump. More particularly, the present invention relates to an improved windshield washer pump for connection to a reservoir and a pair of nozzles through a reservoir hose and a nozzle hose, respectively. The windshield washer pump can be easily mounted to the engine body. The windshield washer pump utilizes check valves to allow washing liquid to be immediately sprayed. Finally, the connectors of the pump are provided with universal hose adapters.

2. Description of Related Art

Various types of windshield washer pumps having a motor, an impeller, a mounting plate, and a fluid entrance and an exit connector are well known. One such conventional windshield washer pump is shown in FIG. 1.

As shown in FIG. 1, the conventional windshield washer pump 110 includes a mounting bracket 111 having a circular engagement hole 122, a terminal 114, and an entrance connector 112 and an exit connector 113 each having an annular raised portion 120, respectively.

However, such conventional windshield washer pumps suffer from a number of problems such as, for example, it is difficult to securely attach the windshield washer pump to a vehicle body. Further, there is a delay before the pump is able to spray washing liquid, and only a fixed type of a reservoir hose and a nozzle hose can be utilized.

SUMMARY OF THE INVENTION

Accordingly, it is an object of the present invention to provide an improved windshield washer pump connected to a reservoir and a pair of nozzles through a reservoir hose and a nozzle hose, which eliminates the above problems encountered with conventional windshield washer pumps.

Another object of the present invention is to provide a windshield washer pump including a pair of vertical and longitudinal engagement holes formed on a mounting bracket for easily mounting the pump to the vehicle body, and a plurality of annular raised portions disposed on a pair of entrance and exit connectors for broadly mating with different size reservoir and nozzle hoses.

A further object of the present invention is to provide a windshield washer pump which includes a check valve having a ball and a spring disposed inside of an entrance channel of an entrance connector, and a check valve having a spring and a ball disposed inside of an exit channel of an exit connector for immediately spraying the washing liquid from nozzles.

Still another object of the present invention is to provide a windshield washer pump which is simple in structure, inexpensive to manufacture, easy in use, and refined in appearance.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention is merely directed to an improved windshield washer pump which includes an entrance connector having a check valve disposed therein and a plurality of annular raised portions disposed thereon, and an exit connector having a check valve disposed therein and a plurality of annular raised portion disposed thereon for effectively spraying the washing liquid and mating with various types of hoses, and a pair of vertical and longitudinal engagement holes disposed on a mounting bracket for easily mounting to the engine body.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DESCRIPTION OF THE PREFERRED EMBODIMENTS

Figure 1:
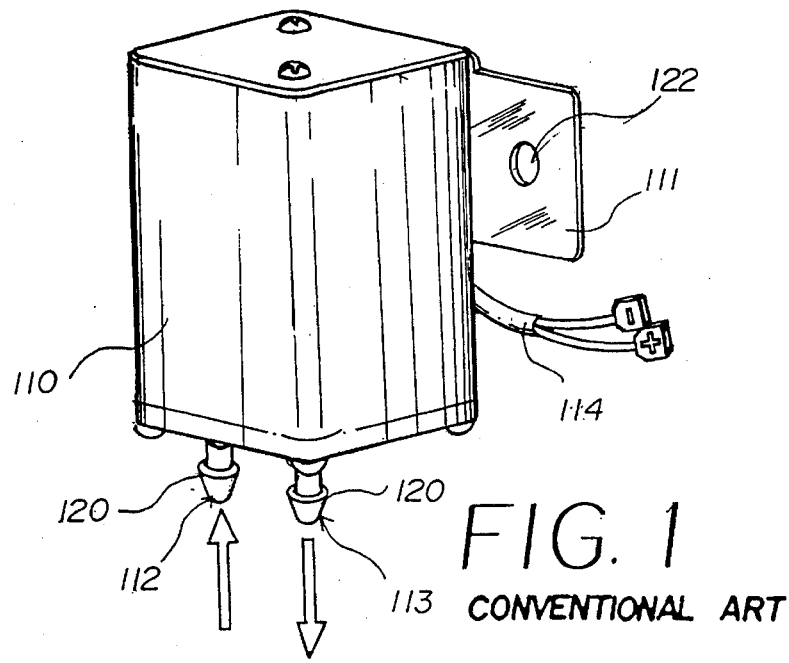
FIG. 1 is a perspective view of a conventional windshield washer pump.
Figure 2:
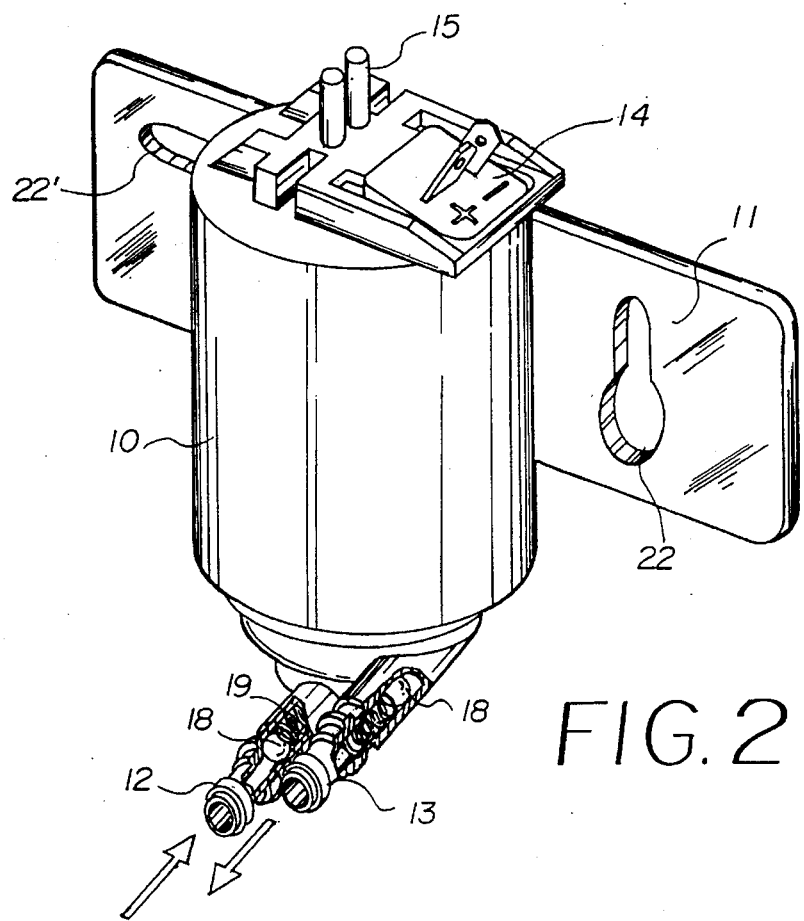
FIG. 2 is a perspective view of the windshield washer pump according to the present invention.
Figure 3:
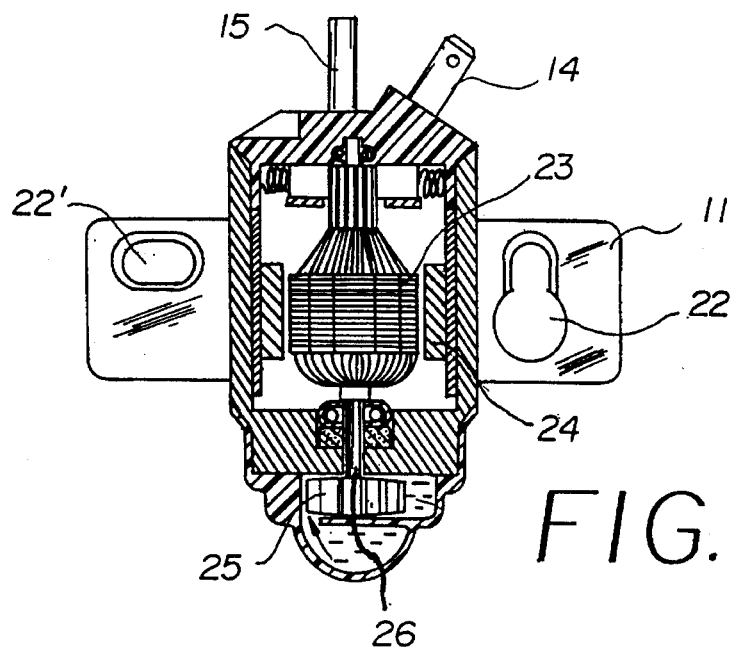
FIG. 3 is a sectional view of FIG. 2.

Referring now in detail to the drawings for the purpose of illustrating preferred embodiments of the present invention, the windshield washer pump as shown in FIGS. 2 and 3, comprises a windshield washer pump housing 10. A mounting bracket 11 is connected to the housing 10. An entrance connector 12 and an exit connector 13 extend from a bottom of the pump housing 10. A terminal 14 and a safety guard 15 are connected to the top of the washer pump housing 10.

As shown in FIG. 3, the windshield washer pump includes a core 23 and a magnet ring 24 disposed within the housing 10. An impeller 25 is connected to the core 23 by a shaft 26. The impeller 25 pumps the washing liquid and delivers the washing liquid to the exit connector 13.

Figure 4:
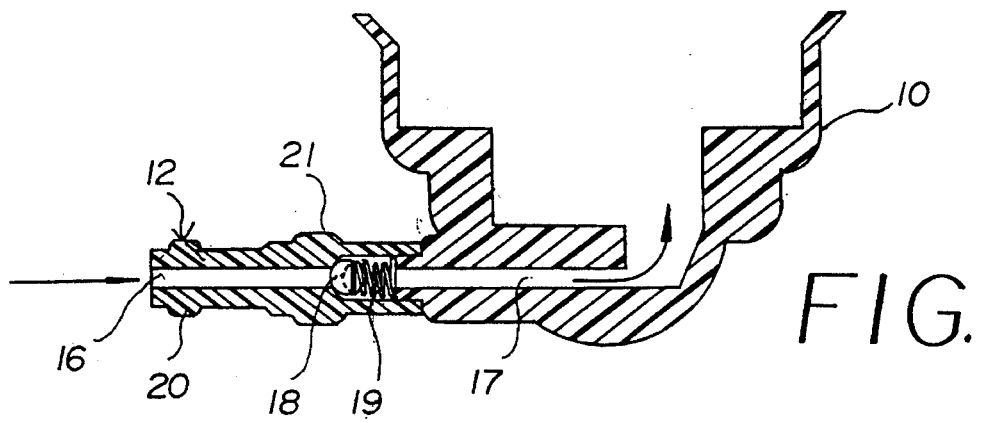
FIG. 4 is a sectional view of an entrance connector including a check valve according to the present invention.
Figure 5:
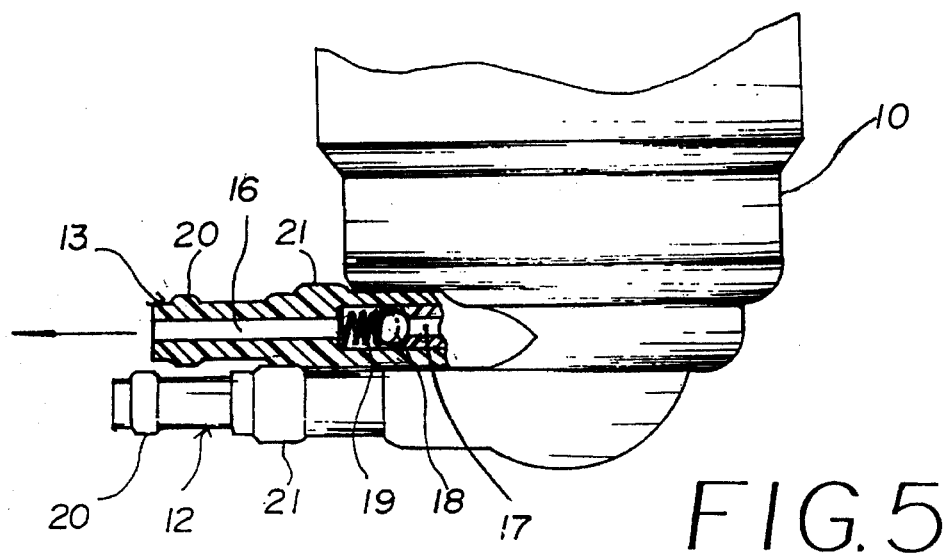
FIG. 5 is a front elevational view of an exit connector according to the present invention containing cut-away portions in order to illustrate the construction of a check valve of the present invention.

As shown in FIGS. 4 and 5, the entrance connector 12 is disposed at a lower portion of the pump housing 10. The exit connector 13 is disposed above the entrance connector 12, so that the impeller 25 can easily and effectively pump the washing liquid from a reservoir (not shown) and deliver the washing liquid to a pair of nozzles (not shown).

As shown in FIG. 4, the entrance connector 12 includes a front channel 16 and a back channel 17 communicated with the front channel 16. A ball 18 and a spring 19 are disposed in a meeting portion of the front channel 16 and a back channel 17. In FIG. 4, the ball 18 is biased toward the front channel 16 by the spring 19. Therefore, while the windshield washer pump is operating, the washing liquid is smoothly introduced into the inner of the washer pump, and when the washer pump stops, the ball 18 and spring 19 operate as a check valve and do not permit washing liquid to flow backward.

In contrast, as shown in FIG. 5, the exit connector 13 includes a front channel 16 and a back channel 17 communicating with the front channel 16. A ball 18 and a spring 19 are disposed in the meeting portion of the front channel 16 and a back channel 17. In FIG. 5, the ball 18 is biased toward to the back channel 17 and by the spring 19. Therefore, while the windshield washer pump is operating, the washing liquid is smoothly discharged into the nozzles (not shown) by way of a hose connected to the exit connector 13. When the washer pump stops, the washing liquid does not flow backward, so that a certain amount of washing liquid remains stored in the nozzle hose and the front channel 16. Accordingly, as soon as the windshield washer pump is activated, the washing liquid sprays immediately.

As shown in FIGS. 4 and 5, the entrance and exit connectors 12 and 13 have a plurality of annular raised portions 20 and 21 for mating with various types of reservoir and nozzle hoses (not shown). That is, the entrance and exit connectors 12 an 13 form a kind of universal hose adapter.

The mounting bracket 11 contains a vertical engagement hole 22 and a longitudinal engagement hole 22' for easily attaching the mounting plate 11 to the vehicle body. For example, a screw (not shown) can be inserted halfway into a position where the windshield washer pump will be placed. The large opening of the vertical engagement hole 22 of the mounting bracket 11 can be placed over the screw and slid down into position. Thereafter, the windshield washer pump swings into the proper position and a second screw (not shown) can be inserted into the longitudinal engagement hole 22', and both screws can be tightened by a screw driver. Accordingly, the windshield washer pump is easily and effectively mounted to the vehicle body.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A windshield washer pump having a pump member and a terminal, said windshield washer pump comprising:

a windshield washer pump housing having an upper portion and a lower portion, a mounting bracket attached to said windshield washer pump housing, and an entrance connector for introducing washer fluid to the pump extending from the lower portion of said windshield washer pump housing and an exit connector through which washer fluid exits the pump extending from said windshield washer pump housing and disposed vertically above said entrance connector, each of said entrance and exit connectors including a channel disposed therewithin, each of said channels containing a ball and a spring for forming a check valve so as to prevent the washer fluid from flowing out the pump through the entrance connector or into the pump through the exit connector;

wherein said entrance connector and said exit connector include a plurality of annular raised portions each having a different diameter for mating with various types of reservoir and nozzle hoses.

2. The windshield washer pump of claim 1, wherein said mounting bracket includes a pair of engagement holes for mounting the mounting bracket to a vehicle, whereby a first of said pair of engagement holes is elongated in a first direction and a second of said pair of engagement holes is elongated in a direction perpendicular to said first engagement hole.

3. The windshield washer pump of claim 1, wherein each said channel defines a first channel and a second channel for containing said check valve disposed within a meeting portion of said first and second channels.

4. The windshield washer pump of claim 3, wherein said plurality of annular raised portions include two annular raised portions.

* * * * *